(12) United States Patent
Mamou-Mani (10) Patent No.: US 10,841,696 B2
(45) Date of Patent: Nov. 17, 2020

(54) SOUND PLAYBACK FROM A DEVICE WITH A VIBRATING MECHANICAL ACTUATOR

(71) Applicant: HYVIBE, Paris (FR)

(72) Inventor: Adrien Mamou-Mani, Paris (FR)

(73) Assignee: HYVIBE, Paris (FR)

( * ) Notice: Subject to any disclaimer, the term of this patent is extended or adjusted under 35 U.S.C. 154(b) by 0 days.

(21) Appl. No.: 16/635,034

(22) PCT Filed: Jul. 20, 2018

(86) PCT No.: PCT/FR2018/051874
§ 371 (c)(1),
(2) Date: Jan. 29, 2020

(87) PCT Pub. No.: WO2019/025700
PCT Pub. Date: Feb. 7, 2019

(65) Prior Publication Data
US 2020/0252722 A1 Aug. 6, 2020

(30) Foreign Application Priority Data
Aug. 1, 2017 (FR) ..................................... 17 57383

(51) Int. Cl.
*H04R 3/04* (2006.01)
*H04R 1/20* (2006.01)
*G10K 11/178* (2006.01)

(52) U.S. Cl.
CPC ......... *H04R 3/04* (2013.01); *G10K 11/17854* (2018.01); *H04R 1/20* (2013.01)

(58) Field of Classification Search
CPC ... H04R 3/12; H04R 3/04; H04R 1/42; H04R 1/2869; H04R 1/2873; H04R 1/28;
(Continued)

(56) References Cited

U.S. PATENT DOCUMENTS

2007/0223736 A1* 9/2007 Stenmark .................. H04R 3/04
381/103

FOREIGN PATENT DOCUMENTS

FR 3 063 173 A1 8/2018
KR 10-1265798 B1 5/2013
(Continued)

*Primary Examiner* — Kile O Blair
(74) *Attorney, Agent, or Firm* — Faegre Drinker Biddle & Reath LLP (57) ABSTRACT

Playing back of a piece of multimedia sound content by means of the vibration of any radiating structure, produced by contact with a playback device comprising: a mechanical actuator applying vibratory excitation to the structure, from a source signal, corresponding to a multimedia sound signal, a sensor sensing a signal from the vibration of the radiating structure, in order to thus: supply the actuator with a source signal, of known frequency components, receive, from the sensor, a vibration signal from the radiating structure operated by the actuator, in order to obtain a frequency response from the radiating structure, correct the source signal supplied to the actuator, by applying a filter correcting the spectral response of the radiating structure such that this response, once corrected, has a flat spectral profile, with amplitude deviations at most of 5 dB, and supply the actuator with the source signal corrected in this way.

11 Claims, 5 Drawing Sheets

(58) Field of Classification Search
CPC ... H04R 1/22; H04R 1/20; H04R 9/18; H04R 2499/11
See application file for complete search history.

(56) References Cited

FOREIGN PATENT DOCUMENTS

WO         97/12359 A1     4/1997
WO    2015/042879 A1     4/2015

\* cited by examiner

SOUND PLAYBACK FROM A DEVICE WITH A VIBRATING MECHANICAL ACTUATOR

CROSS-REFERENCE TO RELATED APPLICATIONS

This application is the U.S. national phase of the International Patent Application No. PCT/FR2018/051874 filed Jul. 20, 2018, which claims the benefit of French Application No. 17 57383 filed Aug. 1, 2017, the entire content of which is incorporated herein by reference.

FIELD

The disclosure relates to a sound rendering of a multimedia content from a rendering device comprising an actuator applying a vibration to a radiating structure.

BACKGROUND

Figure 1:
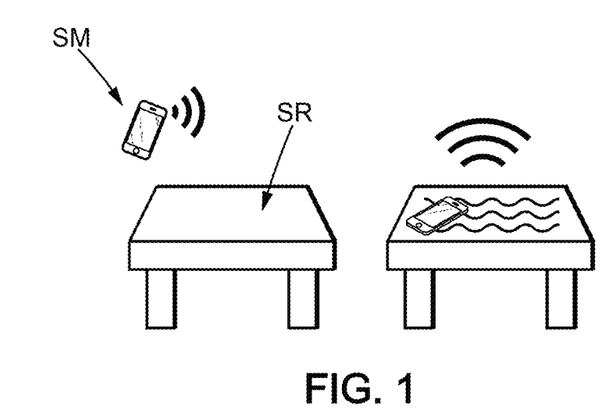
FIG. 1 illustrates a known example of a rendering device placed on an acoustically radiating structure, FIG. 2 schematically illustrates a rendering device according to an exemplary embodiment, FIG. 3 schematically illustrates the steps of a method according to an exemplary embodiment.

Referring to FIG. 1, sound rendering devices are known (notably from the document KR101265798 (B1) for example), which can take the form of a terminal SM of smartphone type for example and that can be placed on an acoustically radiating structure SR, such as the top of a table as illustrated in FIG. 1. Such a device SM can comprise for example:
- a memory storing (permanently or temporarily) multimedia sound contents (music, contents deriving from radio broadcasts, or the like),
- a processor for reading the data content from the memory, and for driving a mechanical actuator defined hereinbelow,
- a mechanical actuator capable, in operation, of applying a processor-controlled vibration to a surface in contact with the device SM.

Such an embodiment is promising for dispensing with the mini loudspeakers usually provided on multimedia rendering devices, such as smartphones, and for using any available radiating structure (table, desk, or the like) to produce an amplified sound deriving from the vibration of the radiating structure.

However, this embodiment has come to be seen to require more refinements, notably because of the diversity of the vibro-acoustic properties of the radiating structures receiving the vibrations from the device SM. Typically, a glass table and a wooden table do not resonate identically, with, for example, sounds that are much more filtered and resonant for the glass than for the wood. Likewise, the dimensions (and/or the geometries, baffle or not) of the radiating structures have an influence on their resonance. Moreover, the position of the device SM on a table for example (at the corner of the table or at the center of the table) also has an influence on the acoustic resonance. The prior art devices do not take account of such differences and the sound can appear degraded depending on the radiating structure accommodating the device SM (for example, typically on a glass or metal support).

The present disclosure improves this situation.

SUMMARY

To this end, according to a first aspect, it proposes a method for rendering a multimedia sound content by vibration of any radiating structure, the vibration of the radiating structure being produced by contact with a rendering device comprising at least one mechanical actuator arranged to apply a vibratory excitation to the radiating structure when it is in contact with the rendering device, from a source signal, corresponding to a multimedia sound signal.

More particularly, the rendering device further comprises, within the meaning of the disclosure, at least one sensor arranged to pick up at least one signal deriving from the vibration of the radiating structure, and the method comprises the steps:
- of supplying the actuator with a source signal having known vibro-acoustic frequency components,
- of receiving from the sensor a vibration signal from the radiating structure applied by the actuator, to obtain, by comparison between the vibro-acoustic frequency vibration signal received from the sensor and the vibro-acoustic frequency components of the source signal, a vibro-acoustic frequency response of the radiating structure,
- of correcting the source signal intended to supply the actuator, by applying a filter correcting the vibro-acoustic frequency response of the radiating structure such that the vibro-acoustic frequency response of the radiating structure, corrected by the correcting filter, comprises an amplitude associated with each frequency such that the difference in absolute value between the amplitude associated with a current frequency and a mean amplitude over all the frequencies is below a chosen threshold,
- and of supplying the actuator with the duly corrected source signal.

Thus, there is proposed a correction of the signal supplying the actuator as a function of a measurement of the vibration picked up by the sensor that the device according to the disclosure then comprises, in order to adapt the vibration applied by the actuator to any type of radiating structure with which the device is in contact.

In one embodiment, the chosen threshold is for example less than or equal to 5 dB. Such an embodiment makes it possible to have a corrected spectral response of the radiating structure that is substantially flat, as if it were a loudspeaker designed for music rendering.

In one embodiment, the correction of the source signal, intended to supply the actuator, can comprise:
- a frequency identification of vibration centers in the vibro-acoustic frequency response of the radiating structure, and
- a creation of the corrective filter to be applied to the source signal to attenuate an amplitude of the source signal at least to the frequencies of the vibration centers of the radiating structure, relative to other frequencies.

Alternatively, in the typical case where it is difficult to accurately identify vibratory centers of the radiating structure, it is possible to carry out a global spectral analysis (for example LPC) as will be seen hereinbelow, to globally neutralize the response of the radiating structure.

Generally, the rendering device can comprise an input interface for an identifier of the radiating structure, and data relating to the vibro-acoustic frequency response of the radiating structure are stored in memory, in a database mapped to the identifier of the radiating structure.

Such an embodiment makes it possible to thus retrieve, based on the identifier of the structure, the vibratory data of the structure and to rapidly calculate a simple updating of the correcting filter (rather than recalculating it completely) to be applied to the source signal.

In a possible embodiment in which the data stored in the database comprise at least prior data on vibration center frequencies of the radiating structure, the abovementioned identification of the vibration center frequencies of the radiating structure can comprise for example:
- a first search in the database, based on the radiating structure identifier, the data relating to prior vibration center frequencies of the radiating structure, previously stored in the database, and
- if the first search is positive, a search for current vibration center frequencies of the radiating structure in the frequency ranges including said prior vibration center frequencies.

More generally, the calculation made to obtain the correcting filter can be distributed with or completely applied by a remote server, and in the case where the rendering device further comprises a communication interface with such a remote server, the method can comprise:
- a transmission, applied by the rendering device, to the remote server, of data on the vibration signal from the radiating structure received by the sensor, with source signal vibro-acoustic frequency component data,
- the determination of the vibro-acoustic frequency response of the radiating structure,
- the creation by the server of the correcting filter to correct the source signal intended to supply the actuator, and
- a transmission, applied by the server, of the correcting filter to the rendering device communication interface, to correct the source signal at the rendering device.

Thus, the abovementioned database can for example be stored in memory at this server.

The present disclosure also targets a computer program comprising instructions for implementing the method defined above, when this program is run by a processor. The general algorithm of such a computer program can be illustrated in FIG. 3 or FIG. 6 which are described later. The instructions of this program can be stored in a memory of the abovementioned rendering device or distributed between this device and the abovementioned server.

According to yet another aspect, the present disclosure also targets such a device for rendering a multimedia sound content by vibration of any radiating structure in contact with the rendering device, this rendering device comprising:
- at least one mechanical actuator arranged to apply a vibratory excitation to the radiating structure from a source signal, corresponding to a multimedia sound signal,
- and at least one sensor arranged to pick up at least one signal deriving from a vibration of the radiating structure, and
- a processor arranged to:
- control the supplying of the actuator with a source signal having known vibro-acoustic frequency components,
- receive from the sensor a vibration signal from the radiating structure applied by the actuator, to obtain, by comparison between the vibro-acoustic frequency vibration signal received from the sensor and the vibro-acoustic frequency components of the source signal, a vibro-acoustic frequency response of the radiating structure,
- correct the source signal intended to supply the actuator, by applying a filter correcting the vibro-acoustic frequency response of the radiating structure such that the vibro-acoustic frequency response of the radiating structure, corrected by the correcting filter, comprises an amplitude associated with each frequency such that the difference in absolute value between the amplitude associated with a current frequency and a mean amplitude over all the frequencies is below a chosen threshold, and control the supplying of the actuator with the duly corrected source signal.

According to yet another aspect, the present disclosure also targets a system comprising:
- such a rendering device, and
- a server capable of communicating with the rendering device and equipped with a processor for:
- receiving from the rendering device data on the vibration signal from the radiating structure received by the sensor of the rendering device, with source signal vibro-acoustic frequency component data,
- determining the vibro-acoustic frequency response of the radiating structure,
- creating a correcting filter to correct the source signal intended to supply the actuator, and
- transmitting the correcting filter to the rendering device, to correct the source signal at the rendering device.

The present disclosure also targets a server of such a system, then comprising a processor for:
- receiving from the rendering device data on the vibration signal from the radiating structure received by the sensor of the rendering device, with source signal vibro-acoustic frequency component data,
- determining the vibro-acoustic frequency response of the radiating structure,
- creating a correcting filter to correct the source signal intended to supply the actuator, and
- transmitting the correcting filter to the rendering device, to correct the source signal at the rendering device.

BRIEF DESCRIPTION OF THE DRAWINGS

Other advantages and features of the disclosure will become apparent on reading the description of exemplary embodiments presented hereinbelow and on studying the drawings in which.

DETAILED DESCRIPTION

Figure 2:
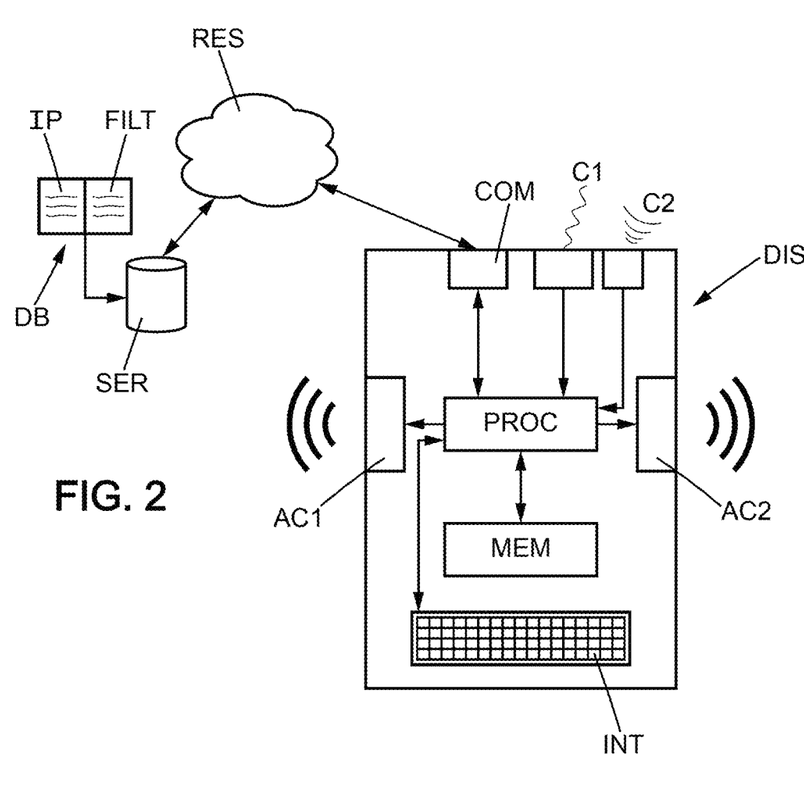

The rendering device DIS of FIG. 2 comprises a processor PROC that can cooperate with a memory MEM storing at least a part of the instructions of the computer program within the meaning of the disclosure. The memory MEM can also store multimedia sound content data, possibly as well as temporary computation data worked by the processor, of the type illustrated in FIG. 3 and commented on later. The device DIS further comprises one or more mechanical actuators AC1 and AC2 (two actuators in the example illustrated for a stereophonic rendering for example respecting the format of the contents). These actuators AC1, AC2 apply a controlled vibration to a support with which the device is in mechanical contact. These actuators transform any surfaces into a loudspeaker membrane by virtue of an electromechanical transduction. The rendering devices comprising such actuators have many advantages: they are small, portable, and strong basses are nevertheless obtained by virtue of the surface with which they are in contact.

One possible type of actuator AC1 can be, for example, that marketed by the company Tectonic® under the model reference TEAX25C10-8/HS. The support can be a table or a desk on which the device DIS is simply placed. Thus, the support forms an acoustically radiating structure, when a vibration is applied to it by the actuator AC1, AC2. More generally, such a support can be anything, and can for example consist of a rigid protective shell of the device DIS.

The device DIS within the meaning of the disclosure also comprises one or more sensors C1, C2, of which at least one is arranged to pick up an acoustic vibration produced by the support with which the device DIS is in contact, when the actuators AC1, AC2 apply a vibration to the support. Such a sensor C1 can for example be that marketed by the company K&K® under the model reference Hot Spot. The other sensor C2 can for example be a microphone for refining the rendering sound (limiting the effects of reverberation of a room in which the device is used, or even to refine an equalization desired by the user of the device, and so on).

The rendering device DIS further comprises a communication interface COM, with a server SER, via a communication network RES, in an embodiment described later with reference to FIG. 6. As will be seen in this exemplary embodiment of FIG. 6, the server SER stores, in a memory, a database DB which archives data on correction filters FILT to be applied to the signal supplying the actuators AC1, AC2, as a function of an identifier ID of a support forming a radiating structure (table, desk, or the like). Furthermore, the rendering device DIS can comprise an input interface INT (available to the user of the device) for entering a support identifier ID.

Figure 3:
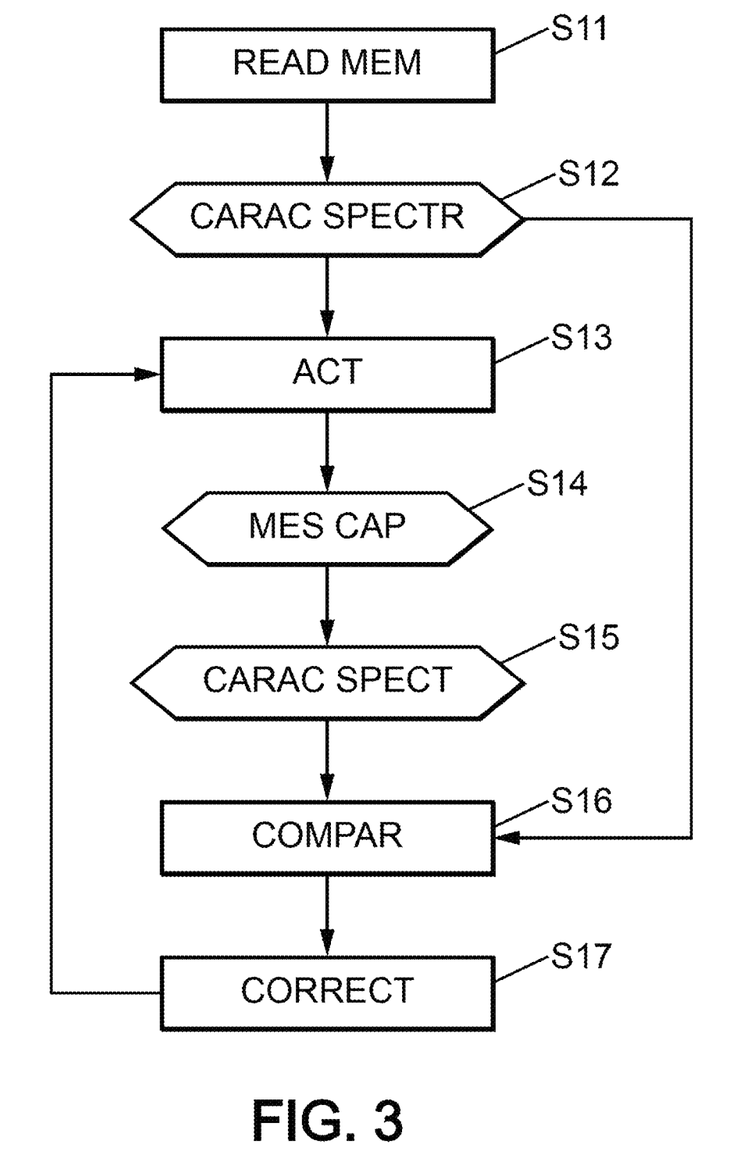

Now referring to FIG. 3, a first step S11 can consist in reading the memory MEM, notably to access a sound content chosen by the user of the device. In the step S12, the processor begins reading this content and identifies in particular its spectral characteristics (sound amplitude as a function of the acoustic frequencies, for example from 30 to 16 000 Hz), over a time window of chosen duration.

In the next step S13, the processor PROC drives the actuators AC1, AC2 to apply a vibration to the support, which behaves as a radiating structure and thus emits a vibro-acoustic signal, measured by the sensors C1, C2 in the step S14. The processor PROC then estimates the spectral characteristics of the vibro-acoustic signal emitted by the radiating structure in step S15 over the abovementioned chosen duration, and compares these characteristics of the signal deriving from the radiating structure to those of the content (determined in the step S12).

Figure 4A:
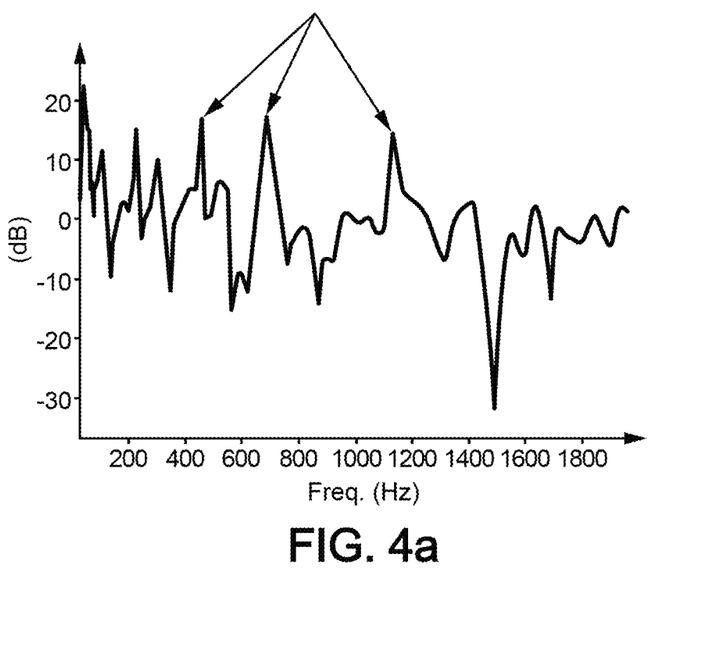
FIG. 4A illustrates an example of spectral response of a radiating structure (here a low metal table) having vibration centers.

FIG. 4A illustrates an example of vibration centers of a radiating structure, corresponding here to a low metal table, and typically having centers at 450 Hz, 700 Hz and 1100 Hz. This frequency response of the radiating structure is derived from the comparison between the spectrum of the vibro-acoustic signal during the vibration of the actuators AC1, AC2, and the spectrum of the source signal (corresponding to the multimedia sound content). This comparison can for example consist in dividing the spectrum of the vibratory signal from the radiating structure by the spectrum of the source signal. It will thus be understood that the abovementioned chosen duration for obtaining these spectra is long enough for example to retain not only the single frequency contribution of the content in the spectrum of the measured vibro-acoustic signal, but above all to identify vibro-acoustic centers in the response to the vibration of the radiating structure. For example, the multimedia sound content can be music (with an analysis window of a duration long enough to obtain all the frequencies in the spectrum of the source signal), or even initially a white noise in which all the acoustic frequencies are present at the same time. However, for more agreeable ease of use, it may be preferable to perform the steps S11 to S16 on the basis of the multimedia sound content to be rendered, the refining of the correction being able to be progressive.

The correction itself, occurring in the step S17 of FIG. 3, can consist in applying a correcting filter to the source signal to attenuate the vibration centers of the radiating structure. The correcting filter, in this embodiment, is more specifically a feedback controller. By way of example, a feedback controller of this type can be that described in the document FR 17 51403.

Figure 4B:
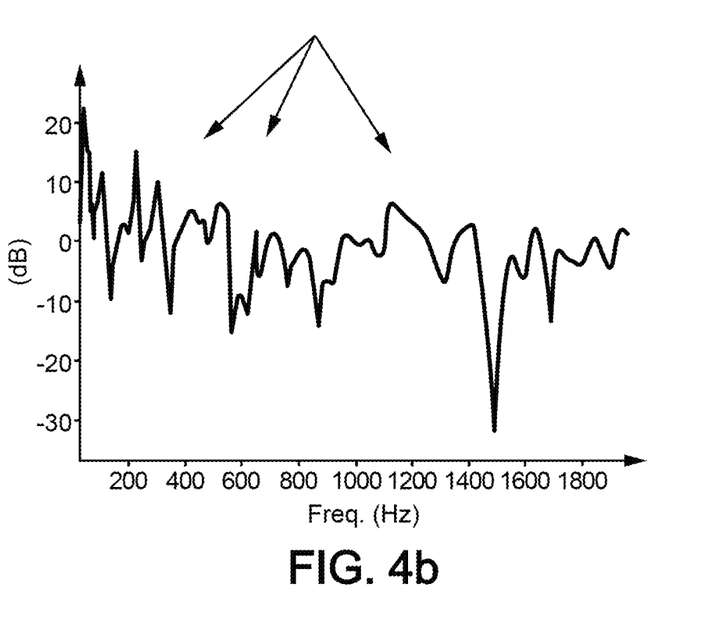
FIG. 4B illustrates an example of corrected spectral response of this radiating structure, FIG. 5 compares the spectral response of another radiating structure (light line curve), here a shoebox, to the same response, corrected (dark line curve), FIG. 6 schematically illustrates the steps of a method according to an exemplary embodiment involving a server.

More generally, this correcting filter can have the effect of "smoothing" (in the sense of attenuating the amplitude of) the frequency peaks corresponding to the vibration centers in the response of the radiating structure, as illustrated in FIG. 4B, by comparison with FIG. 4A. Obviously, this amplitude reduction can be set by an amplitude increase (gain increase) for certain frequencies, typically the frequencies less well represented in the spectral response of the radiating structure, for example in the region of 1500 Hz in FIG. 4A. Such an embodiment makes it possible to retain a uniform means spectral energy. After this correction of the spectral response of the radiating structure, the response itself can have differences in absolute value, between amplitudes associated with different frequencies, which remain below a chosen threshold, for example 5 dB.

Figure 5:
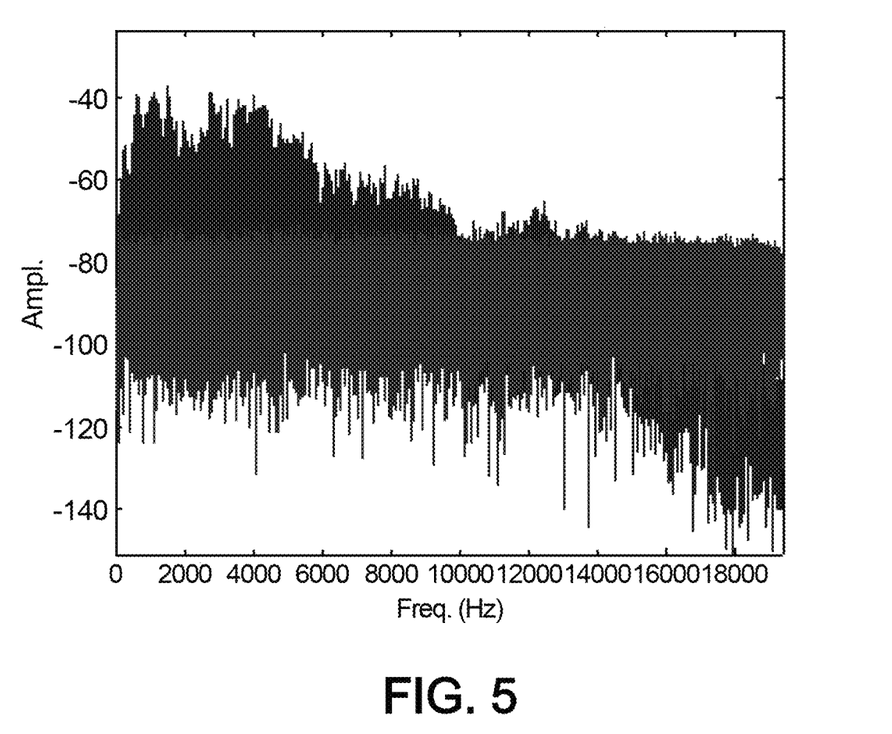

Thus, for example, such a correction has been performed on the spectrum of FIG. 5 which corresponds, here, to the spectral response of a shoebox (relatively light line curve), having a strong representation in the range of the low frequencies because of baffle effect associated with the geometry of this structure. The corrected spectral response (relatively dark line curve) is more flat in amplitude, as presented in FIG. 5.

Thus, it is the filter FILT which can correct the response of the radiating structure (this response then having the appearance of the dark line curve of FIG. 5) which is finally applied to the signal supplying the actuators AC1, AC2, to minimize the effect of the vibration centers of the radiating structure.

Figure 6:
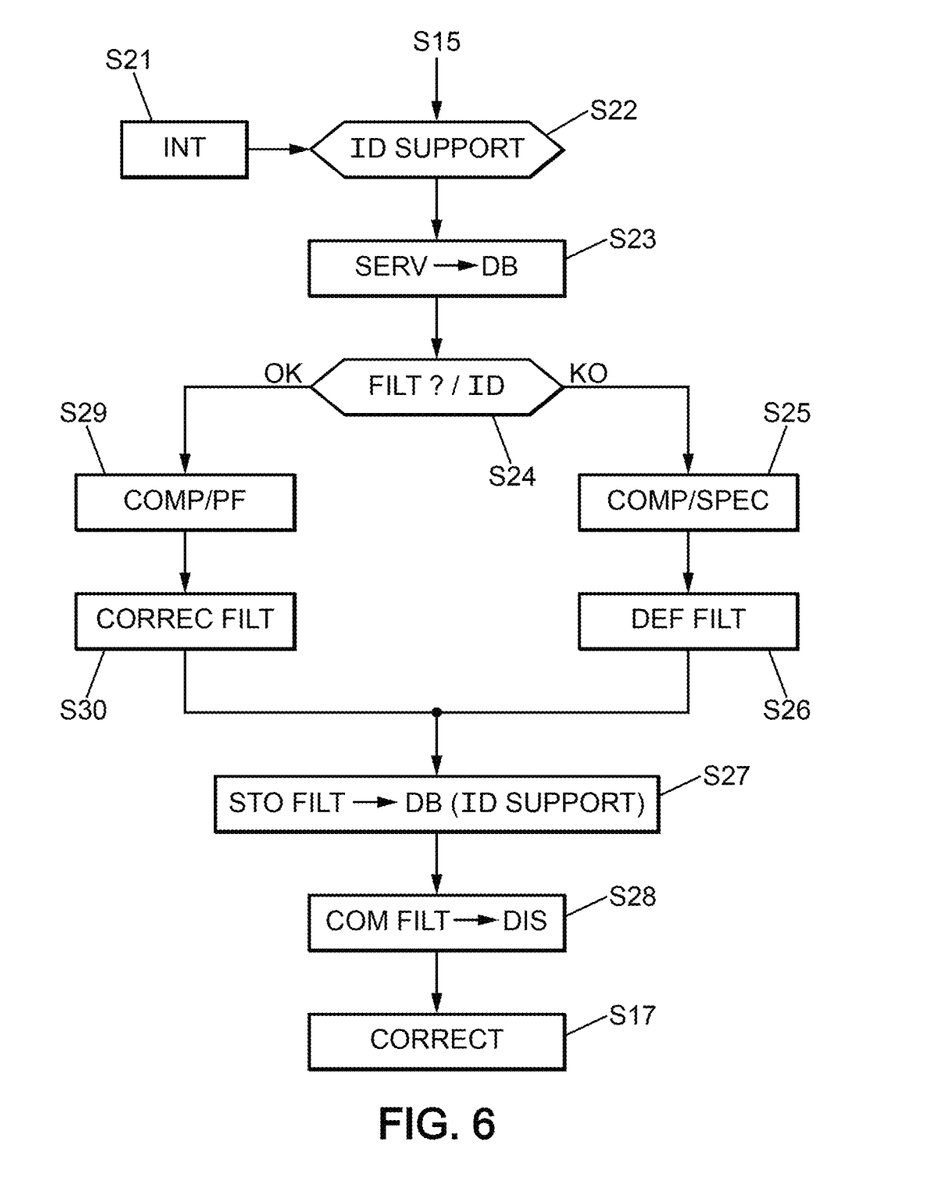

Reference is now made to FIG. 6 illustrating an embodiment in which the abovementioned steps can be performed in a distributed manner between the rendering device DIS and a remote server SER, connected to the rendering device via its communication interface COM. In an alternative approach to this embodiment, all of the steps can be conducted by the rendering device DIS. According to a first approach, the data of the correcting filter FILT can be determined on each use of the rendering device DIS. However, the calculations can be intensive, and it may be advantageous to store the data of the filter FILT in a database (which, in a first embodiment, can be stored in the memory MEM of the rendering device) to avoid systematically reiterating all the abovementioned steps. In such an embodiment, after the first calculation of filter FILT data for a given support (a table in particular for example), a human-machine interface can be driven on the rendering device and prompt the user to input, via the input interface INT, an identifier of this support (for example: "wooden table #1"). Thus, for a subsequent use on the same support the human-machine interface can once again be driven to prompt the user to enter an identifier of this support, if it is already known. If necessary, the device can retrieve from its database filter FILT data corresponding to this "wooden table #1" support. However, it is preferable to recalculate a new correcting filter FILT, at least for the following reasons:
  the vibro-acoustic properties of the support can change over time, and
  the vibro-acoustic properties of the radiating structure can also depend on the position of the device on the support (for example a position of the device on a table corner does not produce the same vibro-acoustic characteristics as a position of the device at the center of the table).

Thus, in an embodiment explained hereinbelow, the filter data are not stored directly mapped to a support identifier, but rather characteristics of the response of the radiating structure are stored. These characteristics exhibit, for example, frequency ranges within which vibration centers of the radiating structure have been identified, in a preceding implementation of the method illustrated in FIG. 3.

For example, a frequency range of plus or minus 10% around a vibration center frequency can be stored, in order for the search for a new vibration center of the radiating structure to be performed within this range. Since the search is thus more targeted, the calculations are less lengthy and require fewer resources from the rendering device DIS.

However, starting from this observation, one embodiment consists in pooling the different measurements that can be performed by rendering devices DIS of the same type and thus holding the database DB not individually on each rendering device, but on a common server SER for a set of rendering devices. In this case, a furniture manufacturer can for example make available spectral response data for different proposed furniture models. The data of a particular model can be available for download from a website, for example via the communication interface COM to speed up and simplify the obtaining of the vibration centers of a current support, of the same model.

Thus referring to FIG. 6, after the step S15 for example of FIG. 3, the device DIS can interrogate the database DB of the server SER in the step S22, on the basis of a support identifier entered by the user in the step S21. The server can look up its database in the step S23 and in particular determine, in the step S24, whether vibration center data (or filter FILT data more generally) have already been determined for this identifier ID.

If such is the case (arrow OK on exiting the test S24), in the step S29 the comparison of the spectra of the source signal and of the signal measured by the sensor or sensors C1, C2 is performed only for frequency ranges including the vibration centers of the current support, stored in the database. The correcting filter to be applied can thus be determined on this basis (or more generally, the preceding correcting filter can itself be corrected with the new data deriving from the sensor C1) in the step S30.

If the support identifier ID is absent from the database (arrow KO on exiting the test S24), the comparison is performed over all the acoustic spectrum in the step S25 and the correcting filter is estimated for the first time, for this support, in the step S26.

Next, in the step S27, the correcting filter data (and notably the vibration center data of the current support) can be stored in the database DB:
  replacing the old data if the corrective filter had already been determined in accordance with the step S30 (thus taking account of a change of this support, in its manufacture, or in the materials used), or
  as data relating to a new support.

The correcting filter FILT data thus updated, can then be transmitted to the rendering device DIS in the step S28, to correct the signal intended to supply the actuators of this device AC1, AC2, in accordance with the step S17 of FIG. 3 previously described.

A few embodiment details and advantages of the implementations explained hereinabove are described hereafter.

At first, the determination of an individual correcting filter for each support is justified as follows.

Any object producing an acoustic radiation can be described by its frequency response, a function that links any force exciting it to the sound that it radiates in a space point (assuming linearity). A good loudspeaker thus has a flat frequency response and it thus radiates all the frequencies with one and the same sound level, thus radiating a signal faithful to the sound source. Now, the objects which have not been designed to radiate sounds do not have a flat frequency response (as illustrated typically in FIGS. 4A, 4B and 5). When they are excited by the actuator, such supports emit sounds of less good quality than a loudspeaker.

At least one sensor is thus added to correct, as presented above, the frequency response of the radiating object.
  A calibration phase can be provided, broken down into:
    measuring the frequency response of the object with a dedicated signal (sliding sine or white noise to cover all the audio spectrum) or directly with the music to be emitted,
    analysis of the frequency response, for example using the LPC (Linear Predictive Coding), WLPC (Warped Linear Predictive Coding) or RFP (Rational Fraction Polynomials) algorithms,
    sending of these data to a remote computer server and comparison with data previously stored (vibration centers, in particular),
    calculation of the compensation for the frequency response defects of the radiating structure (for the chosen target, calculation of inverse filters and/or placement of modal vibration centers depending on the cases).

The aim of this calibration phase is to neutralize the radiating object and thus obtain sounds faithful to the source signals.

The results of this calibration are sent from the server to the processor PROC of the device DIS (for example an internal DSP). Next, corrections of the frequency response of the vibrating support can be made, based on the filtering (adaptive or not) of the input signal and/or even on the feedback control of the resonances of the vibrating support.

The use of an appropriate processor (ARM Cortex M7 for example) allows for a real time processing with low latency with a hybrid architecture for audio and vibration control. A set of transducers (sensors and electromechanical actuators) positioned to mechanically select the resonances of the surface of the support in contact makes it possible to apply an effective electromechanical modal filtering. Algorithms for identifying vibratory parameters of the surface in contact, possibly shared between the rendering device and a remote server, contribute to this effectiveness. These algorithms thus control the vibration of the support thus making it possible to give a target sound quality. The content of the abovementioned database DB can also be maintained through the implementation of a vibratory and musical information exchange platform linking the user to the manufacturer of the support whose surface is in contact with the device.

The embodiment within the meaning of the disclosure was tested in substantially real time on the radiating structure (metal table) whose spectral response is illustrated in FIG. 4A. On listening initially to music and/or spoken voice, broadcast by the metal table, a sound that is correct, but with certain defects, is perceived. The frequency response of the object shows several peaks amplifying the incoming signal by approximately 10 dB compared to the mean. These peaks originate from vibration modes, resonances of the object. The analysis of this frequency response by "Rational Fraction Polynomials" (RFP) algorithm makes it possible to identify essentially three vibration modes. Their characteristics (frequencies, dampings, amplitude) are integrated in the processor PROC in which there is implemented a state space modal control algorithm. A 400% increase in the dampings of these three modes makes these three modes disappear (as illustrated in FIG. 4B). When applied to different sound sources (rock music, jazz, radio spoken voice), the modal control of these three modes made it possible to make the main defects of the radiated sounds disappear.

Concerning the example of FIG. 5, on listening to music radiated by this object (here, a shoebox), localized frequency defects are no longer perceived, but rather wide amplified or reduced zones. The response to a white noise of the object is presented in FIG. 5 (light lines). Variations of very high levels (80 dB) appear with wide amplification bands. After LPC analysis with 1000 coefficients then inverse filtering deriving from these coefficients (LPC compensation), the response becomes flat (dark lines of FIG. 5). When applied to a music signal, the radiated sound obtained by this object has a quality faithful to the source signal.

Of course, the present disclosure is not limited to the embodiments described above by way of example; it extends to other variants.

Thus, for example, the storage of vibration center data of a structure (when such parameters are measurable) has been described above. Obviously, the storage and the archiving in a database of any other parameter characterizing the spectral response of a radiating structure can be envisaged, such as, notably, the LPC coefficients of a preceding analysis relating to baffle radiating structure as described above with reference to FIG. 5.

The invention claimed is:

1. A method for rendering a multimedia sound content by vibration of any radiating structure, the vibration of the radiating structure being produced by contact with a rendering device comprising:
   at least one mechanical actuator arranged to apply a vibratory excitation to the radiating structure when it is in contact with the rendering device, from a source signal, corresponding to a multimedia sound signal,
the rendering device further comprising at least one sensor arranged to pick up at least one signal deriving from the vibration of the radiating structure, the method comprises:
   supplying the actuator with a source signal having known vibro-acoustic frequency components,
   receiving from the sensor a vibration signal from the radiating structure applied by the actuator, to obtain, by comparison between the vibro-acoustic frequency vibration signal received from the sensor and the vibro-acoustic frequency components of the source signal, a vibro-acoustic frequency response of the radiating structure,
   of correcting the source signal intended to supply the actuator, by applying a filter correcting the vibro-acoustic frequency response of the radiating structure such that the vibro-acoustic frequency response of the radiating structure, corrected by the correcting filter, comprises an amplitude associated with each frequency such that the difference in absolute value between the amplitude associated with a current frequency and a mean amplitude over all the frequencies is below a chosen threshold,
   and supplying the actuator with the thusly corrected source signal.

2. The method as claimed in claim 1, wherein the chosen threshold is less than or equal to 5 dB.

3. The method as claimed in claim 1, wherein the correction of the source signal, intended to supply the actuator, comprises:
   a frequency identification of vibration centers in the vibro-acoustic frequency response of the radiating structure, and
   a creation of the corrective filter to be applied to the source signal to attenuate an amplitude of the source signal at least to the frequencies of the vibration centers of the radiating structure, relative to other frequencies.

4. The method as claimed in claim 1, wherein, the rendering device comprises an input interface for an identifier of the radiating structure, data relating to the vibro-acoustic frequency response of the radiating structure are stored in memory, in a database mapped to the identifier of the radiating structure.

5. The method as claimed in claim 3, wherein, the rendering device comprises an input interface for an identifier of the radiating structure, data relating to the vibro-acoustic frequency response of the radiating structure are stored in memory, in a database mapped to the identifier of the radiating structure, and wherein said data stored in the database comprise at least vibration center frequency data concerning the radiating structure and the frequency identification of vibration centers of the radiating structure comprises:
   a first search in the database, based on the radiating structure identifier, for data relating to prior vibration center frequencies of the radiating structure, previously stored in the database, and
   if the first search is positive, a search for current vibration center frequencies of the radiating structure in the frequency ranges including said prior vibration center frequencies.

6. The method as claimed in claim 1, wherein, the rendering device further comprises a communication interface with a remote server, the method comprises:
   a transmission applied by the rendering device, to the remote server, of data on the vibration signal from the radiating structure received by the sensor, with source signal vibro-acoustic frequency component data,
   the determination of the vibro-acoustic frequency response of the radiating structure applied by the server,
   the creation by the server of the correcting filter to correct the source signal intended to supply the actuator, and
   a transmission, applied by the server, of the correcting filter to the rendering device communication interface, to correct the source signal at the rendering device.

7. The method as claimed in claim 6, wherein, the rendering device comprising an input interface for an identifier of the radiating structure, data relating to the vibro-acoustic frequency response of the radiating structure are stored in memory, in a database mapped to the identifier of the radiating structure, and wherein said database is stored in memory at the server.

8. A non-transitory computer readable medium storing a program causing a computer to execute the method as claimed in claim 1, when this program is run by a processor.

9. A device for rendering a multimedia sound content by vibration of any radiating structure in contact with the rendering device, the rendering device comprising:
- at least one mechanical actuator arranged to apply a vibratory excitation to the radiating structure from a source signal, corresponding to a multimedia sound signal, the device further comprising:
- at least one sensor arranged to pick up at least one signal deriving from a vibration of the radiating structure, and
- a processor arranged to:
  - control the supplying of the actuator with a source signal having known vibro-acoustic frequency components,
  - receive from the sensor a vibration signal from the radiating structure applied by the actuator, to obtain, by comparison between the vibro-acoustic frequency vibration signal received from the sensor and the vibro-acoustic frequency components of the source signal, a vibro-acoustic frequency response of the radiating structure,
  - correct the source signal intended to supply the actuator, by applying a filter correcting the vibro-acoustic frequency response of the radiating structure such that the vibro-acoustic frequency response of the radiating structure, corrected by the correcting filter, comprises an amplitude associated with each frequency such that the difference in absolute value between the amplitude associated with a current frequency and a mean amplitude over all the frequencies is below a chosen threshold,
  - and control the supplying of the actuator with the duly corrected source signal.

10. A system comprising:
the rendering device as claimed in claim 9, and
a server capable of communicating with the rendering device and equipped with a processor for:
- receiving from the rendering device data on the vibration signal from the radiating structure received by the sensor of the rendering device, with source signal vibro-acoustic frequency component data,
- determining the vibro-acoustic frequency response of the radiating structure,
- creating a correcting filter to correct the source signal intended to supply the actuator, and
- transmitting the correcting filter to the rendering device, to correct the source signal at the rendering device.

11. A server of the system as claimed in claim 10, comprising a processor for:
receiving from the rendering device data on the vibration signal from the radiating structure received by the sensor of the rendering device, with source signal vibro-acoustic frequency component data,
determining the vibro-acoustic frequency response of the radiating structure,
creating a correcting filter to correct the source signal intended to supply the actuator, and
transmitting the correcting filter to the rendering device, to correct the source signal at the rendering device.

* * * * *